United States Patent
Erdmenger et al.

(10) Patent No.: US 6,898,589 B2
(45) Date of Patent: May 24, 2005

(54) PERFORMANCE OPTIMIZER FOR THE TRANSFER OF BULK DATA BETWEEN COMPUTER SYSTEMS

(75) Inventors: Joerg Erdmenger, Waldenbuch (DE); Matthias Kubik, Altdorf (DE)

(73) Assignee: International Business Machines Corporation, Amonk, NY (US)

( * ) Notice: Subject to any disclaimer, the term of this patent is extended or adjusted under 35 U.S.C. 154(b) by 420 days.

(21) Appl. No.: 10/029,479

(22) Filed: Dec. 21, 2001

(65) Prior Publication Data

US 2002/0174267 A1 Nov. 21, 2002

(30) Foreign Application Priority Data

Mar. 1, 2001 (DE) ......................................... 011 00 247

(51) Int. Cl.[7] .............................................. G06F 17/30
(52) U.S. Cl. ............................. 707/2; 707/10; 707/100; 707/104.1; 709/232
(58) Field of Search .......................... 707/10, 100–101, 707/104.1; 709/232–233, 223, 224

(56) References Cited

U.S. PATENT DOCUMENTS

| | | | |
|---|---|---|---|
| 5,778,395 A | | 7/1998 | Whiting et al. |
| 5,907,844 A | * | 5/1999 | Guay et al. ................ 707/100 |
| 6,363,384 B1 | * | 3/2002 | Cookmeyer et al. .......... 707/10 |
| 6,529,954 B1 | * | 3/2003 | Cookmeyer et al. ........ 709/224 |

OTHER PUBLICATIONS

Song et al., Optimizing Bulk Data Transfer Performance: A Packet Train Approach, ACM 1988, pp. 134–145.*

* cited by examiner

*Primary Examiner*—Greta Robinson
*Assistant Examiner*—Debbie M. Le
(74) *Attorney, Agent, or Firm*—William A. Kinnaman, Jr.; Lawrence D. Cutter (57) ABSTRACT

For the transfer of bulk data between a client computer system and at least one server computer system, throughput-relevant information is gathered from system components involved in the transfer. The information gathered is passed to a knowledge base that holds algorithms and data on relations and combinations of throughput-relevant information. By means of the knowledge base a set of performance parameters is generated that are effective to achieve a maximum data throughput. The determined set of performance parameters is used for a setup and configuration of a data transfer controller that controls the system complex for the transfer a maximum of data within a minimum amount of time and to reduce the expenditure for the system setup and configuration before the transfer is started. The data transfer may be part of backup and restore operations of bulk data.

18 Claims, 5 Drawing Sheets

PERFORMANCE OPTIMIZER FOR THE TRANSFER OF BULK DATA BETWEEN COMPUTER SYSTEMS

BACKGROUND OF THE INVENTION

1. Field of the Invention

The invention relates to the performance optimizing of bulk data transfer between computer systems each having storage devices able to store large amounts of data.

2. Description of the Related Art

Complex computer systems store and process large amounts of data which often are of vital importance to an enterprise. In such environment a regular data backup is an important concept to ensure the system integrity and to allow fast system regeneration in case of a system dropout. A data backup operation requires movement of huge amounts of data from a source location, which may be a set of system disk storage devices, to a data storage pool, which may be a set of tape storage devices or again disk storage devices. The amount of data to be transferred extends from some kilobytes up to many terabytes. The transfer of such bulk data may involve a data transport through local or remote network connections. It is controlled by a backup control tool operable on various software platforms including AIX, Solaris, HP-UX, Windows NT, Linux and others. The backup control tool is responsible for transferring the data from a source location to a target storage pool.

Bulk data transfer operations require a considerable share of system workload, which only in some cases can be shifted to hours of a day where the regular system workload is low. If network connections are involved, the data transfer also takes a large amount network bandwidth and connect time. It is therefore a demand of bulk data transfer operations to move a maximum of amount of data within a minimum amount of time. Furthermore, there is also an interest to reduce the expenditure required to adjust the system parameters for an effective bulk data transfer operation.

U.S. Pat. No. 5,778,395 discloses a system for backing up files from disk volumes on multiple nodes of a computer network. In this system duplicate files or portions thereof are identified across the nodes to make sure that only a single copy of the contents of duplicate files is stored in the backup storage. The backup operations are restricted to those files which have been changed since the last backup operation. In addition, differences between a file and its version that was the subject of the previous backup operation are determined and only the changes are written on the backup storage means. These measures aim to reduce the amount of data which are the subject of the backup storing in order to reduce the amount of backup storage and the amount of network bandwidth required for performing the backup. This system requires a considerable processing expenditure in advance of the actual data transfer and storing operation.

SUMMARY OF THE INVENTION

It is an object of the invention to increase the data throughput in performing bulk data transfer operations.

Furthermore, it is an object of the invention to reduce the period of time during which a complex computer system has to perform bulk data transfer operations including backup and restore operations.

It is also an object of the invention to free the administrator of a computer system complex from an empirical setup of system parameters in order to increase the performance of data backup and restore operations.

According to the invention, as defined in the claims, for the transfer of bulk data between computer systems, for example, between a client computer system and a server computer system, throughput-relevant information is gathered from system components involved in the transfer. The throughput-relevant information is passed to a knowledge base which holds algorithms and data on relations and combinations of throughput-relevant information. By means of the knowledge base a set of performance parameters is generated which are effective to achieve a maximum data throughput. The determined set of performance parameters may be used to set up and configure the system complex for performing the data transfer, which may be part of a backup or restore operation for bulk data.

It is one aspect of the invention to extend the gathering of throughput-relevant information to a network which is used to connect the client to the server computer system and to all servers used. On the basis of the information gathered the performance of the client and its subsystems, the performance of the network and the performance of the servers are evaluated. The set of performance parameters determined preferably includes the usage of data compression, the multiplex factor to be applied and the number of sessions to be used.

The invention allows transfer of a maximum of data within a minimum amount of time and reduction of the expenditure for the system setup and configuration before the transfer is started.

DESCRIPTION OF THE PREFERRED EMBODIMENTS

Figure 1:
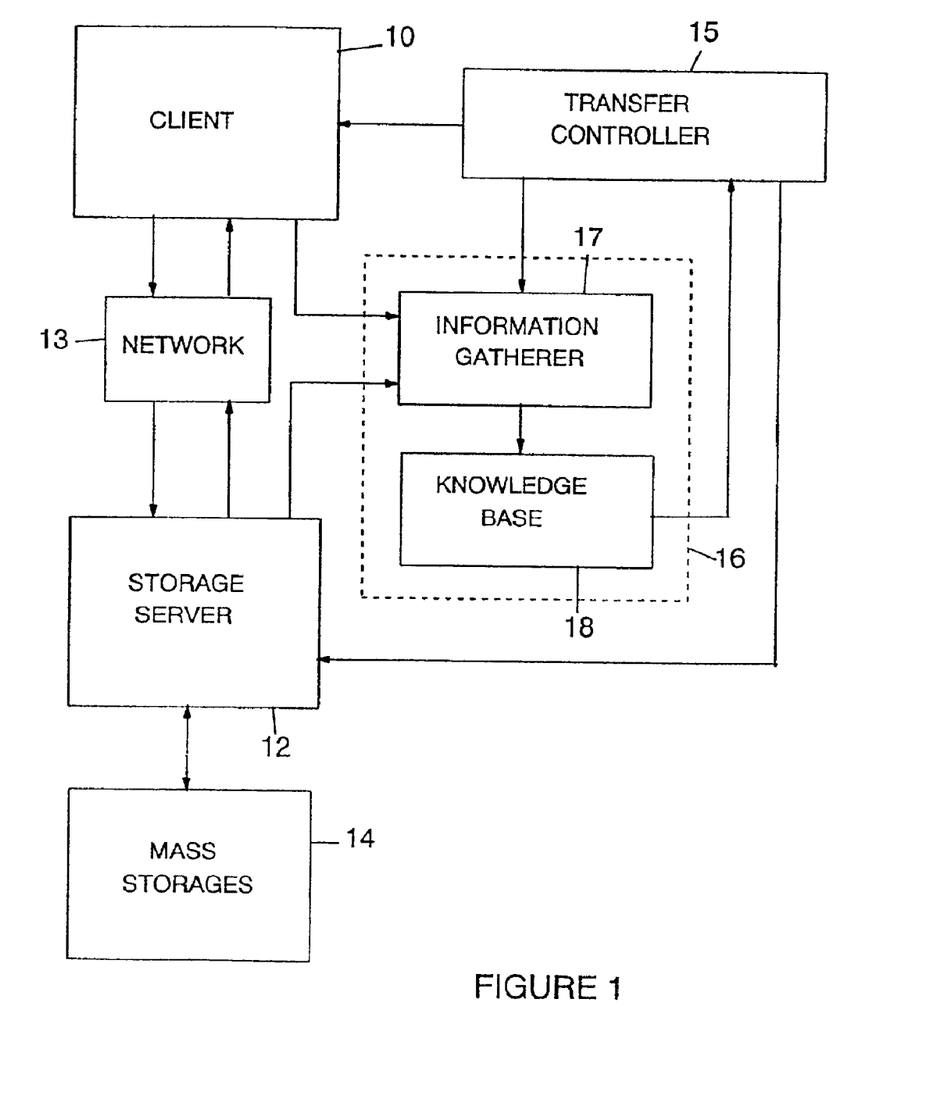
FIG. 1 is a general block diagram of a computer system comprising a data transfer performance optimizer according to the invention.

FIG. 1 shows a schematic block diagram of a computer system in which an embodiment of the invention is implemented. The computer system consists of a client computer 10 and a storage server 12 which are connected with each other through a network 13. The storage server 12 receives bulk data from the client 10 to store it in a mass storage 14. The storage server 12 also transfers bulk data from storage 14 to the client 10. The data transfers take place under the control of a transfer controller 15.

A performance optimizer 16 is connected to the transfer controller 15 to increase the throughput in the transfer of huge amounts of data from the storage of the client 10 to mass storage 14 and vice versa. The controller 16 comprises an information gatherer 17 and a knowledge base 18. The information gatherer 17 serves for collecting system parameters of both the client 10 and the storage server 12 in advance of a data transfer operation. The knowledge base 17 evaluates the system parameters and generates performance parameters which are used to tune the controller 16 for a high-performance transfer of data from the client 10 to the mass storage 14 or from the mass storage 14 to the client 10. The controller 15, the information gatherer 17 and the knowledge base 18 are software components which run on the client system 10 and in part also on the storage server 12.

Figure 2:
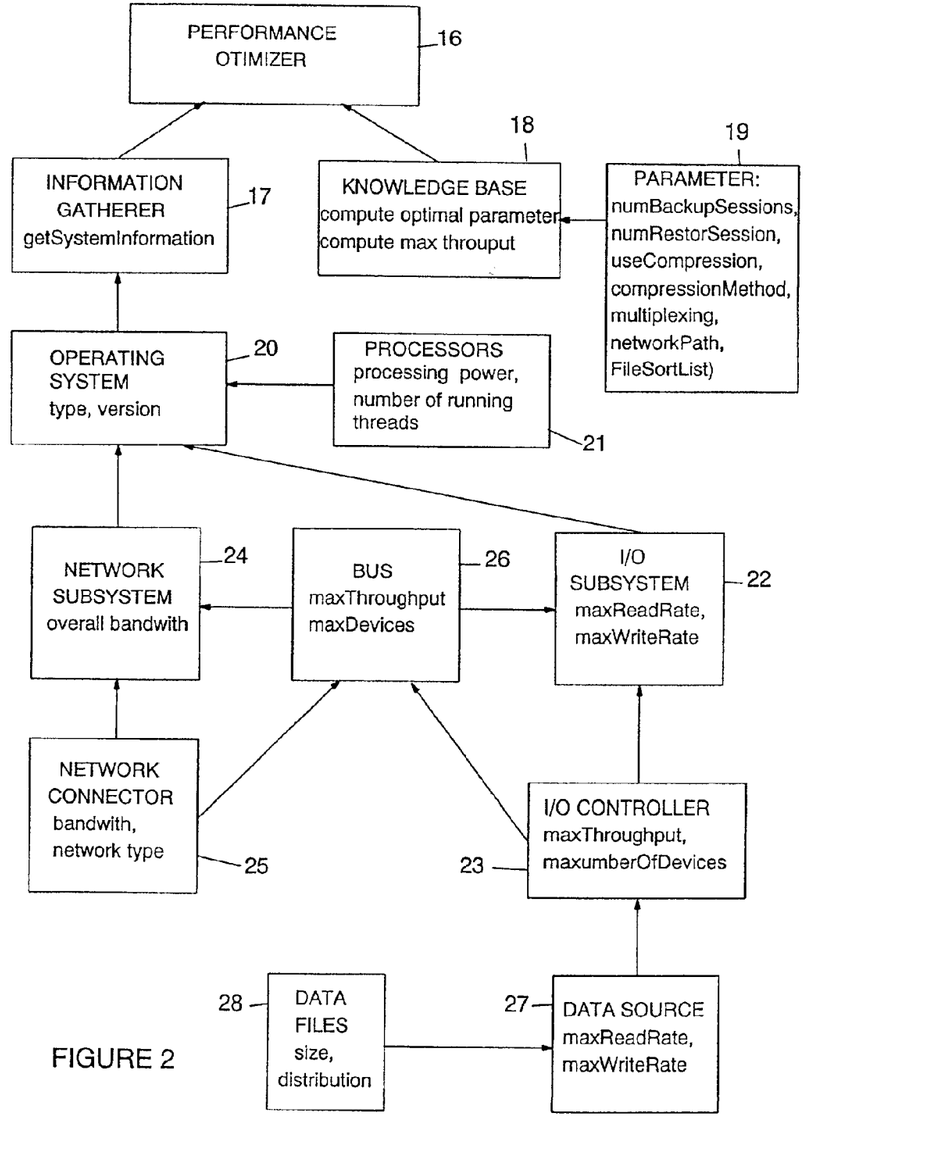
FIG. 2 is a block diagram the system components involved in the operation of the data transfer performance optimizer of FIG. 1.

FIG. 2 shows the system components which contribute to the information gathering. It shows further the relationship among those components, the type of parameters gathered and the type of performance parameters generated by knowledge base 18. First, the information gatherer 17 has to determine type and version of the operating system 20 which is used by the client computers 10. Through the operating system parameters of processors 21 are gathered including the number of processors contained in the client 10, their processing power and the number of threads they are able to run in parallel. Furthermore, an input/output subsystem 22 provides throughput parameters including the maximal read rate and the maximal write rate. Connected therewith are input/output controllers 23 which provide parameters on their maximal data throughput and on the number of supported input/output devices such as magnetic disk storage devices. A network subsystem 24 provides parameters on its overall bandwidth and also provides parameters of network connectors 25 including their bandwidth and the network type used. A bus subsystem 26 which supports the input/output subsystem 22 and the network subsystem 24 provides parameters on the maximal throughput of the buses and the number of devices attached to the buses such as local network connectors, intranet or Internet connectors etc. Devices of this type may consume a substantial amount of processor power which then is not available for performing the transfer operations. Further system components which provide throughput parameters are the data sources 27, i.e. the storage volumes of the client 10 such as magnetic disk drives, and the data files 28 stored in the data sources 27. The parameters provided by the data sources 27 include the maximal read rate and the write rate, and the sources parameters provided by the data sources 27 include the number, size and distribution of the files to be transferred.

Gathering of Throughput-relevant Information

The information gathering extends to system information including parameters which are relevant for the data throughput of a data transfer operation. Relevant are parameters of the input/output subsystem comprising data buses, input/output controllers and the disk storage devices. Relevant are also parameters of the files which are subject of the transfer and parameters of the client and server computer and of the network connecting both.

In particular, for the input/output subsystem the information gathered includes the number of I/O buses available, the throughput per bus, the number of controllers per bus, the number of I/O controllers available, the throughput per controller, the number of disk storage devices per controller and the throughput per disk. The information gathered on the file system includes information on the distribution of the files over the disk storage devices, the size of the files, the kind of the files such as binary, ASCII. The information gathered on the computer systems includes the number of processors, the computing power of the processors, and the processes or tasks or threads the system is able to run in parallel. In addition, for the computer systems operating as storage servers the information gathered includes the number of processors involved, the kind of storage devices installed such as tape storage devices, disk storage devices, optical storage devices etc., the number of tape drives, the throughput per tape drive, the number of tape drives per controller and the number of controllers per bus. The information gathered on the network includes the number of network connectors, the kind of the connectors used such as Fibre Channel, Token Ring, Ethernet, Sequential Area Network, the throughput per connector and which storage server is reachable through which connector.

Information Generated by Means of the Knowledge Base

The information gathered allows the knowledge base to generate information which is used to setup and configure the system complex for a maximal data throughput during a transfer operation. The object of the process is to generate parameters which are suitable to optimize the overall data throughput in GB/h (Gigabyte per hour) of end-to-end transfer operations.

Among the information to be generated is the maximum number of processes or threads to be used by the transfer operation. It depends on the number of processors involved, on the processing power of the system same question and on other processes running on the system. A system slow down is not acceptable if some performance relevant application are running on the same system.

Other information to be generated includes the use of compression, the type of compression to be used, and the phase of operations when compression is applied, i.e. before or after the multiplexing. The information depends on the overall network throughput, on the processing power of the system and on other processes running on the system.

Furthermore, by means of the knowledge base it has to be decided whether a sort file operation is required in advance of a data transfer operation which depends on the gathered information about the disk storage subsystem and the distribution of the files over the disk storage devices. By a file sort to different disks the performance of the subsequent transfer of the files may be substantially increased. Furthermore, it has to be decided whether multiplexing has to be used. This depends on a response to the questions whether there are network connections which are faster than the read rate of single disk storage devices, and how many storage servers are available, how many tape drives are available and what is the throughput of the tape drives.

By means of the knowledge base it has also to be determined whether parallel sessions have to be used and how many of them. This depends on the throughput of the network connections and further on a response to the questions of how many storage servers are available, how many tape drives per storage server are available, what is the throughput of the tape drives, how many disk storage devices are attached to which disk controller and how are the files distributed over the disk storage devices.

Figure 3:
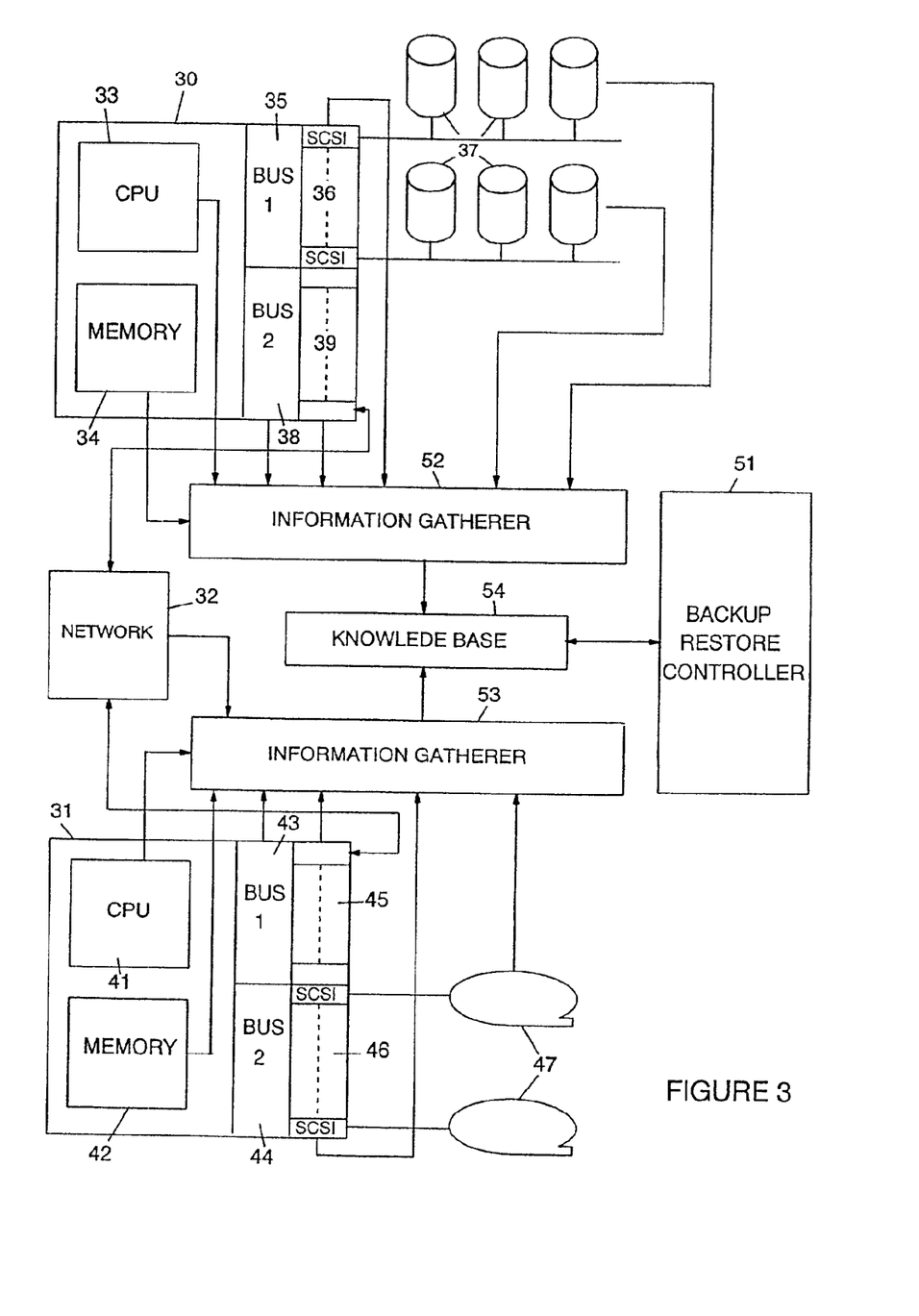
FIG. 3 is block diagram of an implementation of the backup/restore performance optimizer according to the invention.

FIG. 3 shows a block diagram of an implementation of the invention for performing data backup and restore operations. The computer complex shown in FIG. 3 comprises a host computer system 30 which operates as a client and a host computer system 31 which operates as a storage server. Both host computer systems are connected with each other through a network 32. The host 30 contains at least one processor 33 and a memory 34. The host 30 further contains a first data bus 35 to which a number of input/output controllers 36 are connected. In FIG. 3 these I/O controllers are SCSI controllers. Other types of I/O controllers may be used instead. Each of the I/O controllers 36 support a number of disks 37 which may be well known magnetic disk storage devices. The host 30 further contains a second data bus 38 to which a number of controllers 39 are connected. At least one of the controllers 39 supports a network connector to the network 32.

The host 31 contains at least one processor 41 and a memory 42. The host 31 further contains a first data bus 43 to which a number of controllers 45 are connected. At least one of the controllers 45 supports a network connector to the network 32. The host 31 further contains a second data bus 44 to which a number of input/output controllers 46 are connected. In FIG. 3 these controllers are SCSI controller but other types of controllers I/O controllers may be used instead. At least some of the input/output controllers 46 support a number of high volume storage devices 47 which may be well known magnetic tape drives, disks of optical storage devices.

A backup-restore controller 51 serves to perform a backup of data from the disks 37 to the tapes 47 and to transfer data from the tapes 47 to the disks 37 during a restore operation. The backup-restore controller 51 runs on the host 30 as application program. A first information gatherer 52 is used to collect throughput-relevant parameter information from the components of the host 30. These components include the processors 33, the memory 34, the buses 35 and 38, SCSI controllers 36, the disks 37 and the controllers 39. The first information gatherer 52 runs on the host 30 as application program.

A second information gatherer 53 is used to collect throughput-relevant parameter data from the components of the host 31 and from the network 33. These components include the processors 41, the memory 42, buses 43 and 44, the controllers 45, the network connector attached to one of the controllers 45, the SCSI controllers 46 and the tape drives 47. The second information gatherer 53 runs on the host 31 as an application program.

The information gatherers 52 and 53 supply the collected data to a knowledge base 54 which generates performance parameters as will be described subsequently. The performance parameters will be used by the backup-restore controller 51 to increase the data throughput during the backup of data from the disks 37 to the tapes 47 and during the restore operations by a transfer of data from the tapes 47 to the disks 37.

Figure 4:
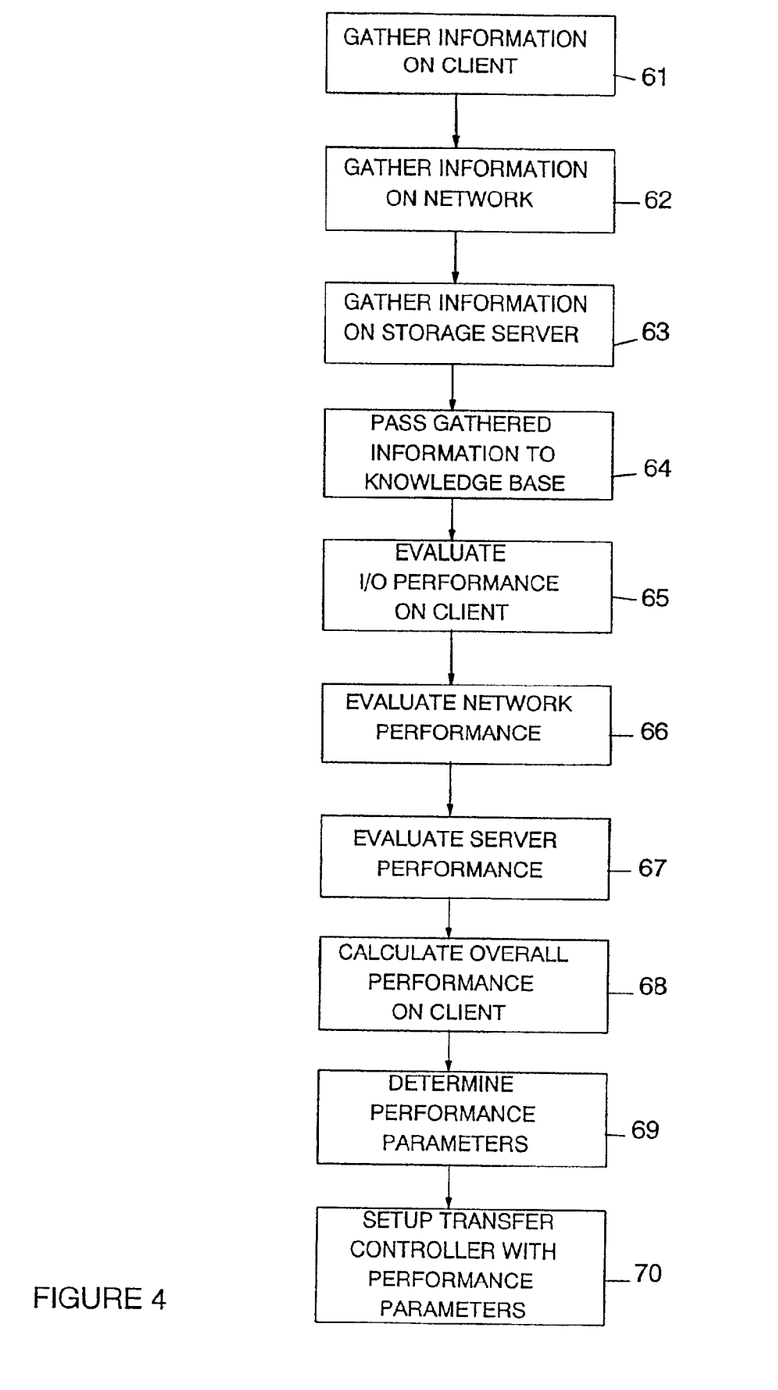
FIG. 4 is schematic flow diagram of a method according to the invention.

FIG. 4 shows an example of the method according to the invention comprising the steps of information gathering, evaluating the gathered information, calculating the overall performance and determination of performance parameters. In step 61 throughput-relevant information is gathered from the client which may be the host 30 of FIG. 3. Step 62 collects throughput-relevant information of the network which may be the network 32 of FIG. 3. In step 63 throughput-relevant information is gathered from the storage server which may be the host 31 of FIG. 3. Step 64 passes the gathered information to the knowledge base for being used in the subsequent evaluations. Step 65 performs an evaluation of the I/O performance by using the information data gathered in step 61. Step 66 performs an evaluation of the network performance by using the information data gathered in step 62. Step 67 performs an evaluation of the storage server performance by using the information data gathered in step 63. In step 68 the overall performance of the client is calculated to determine a maximum of data throughput. Step 69 determines the performance parameters of the system. This step includes the determination whether a data compression has to be used for the data subject of the backup operation. Step 69 also determines the multiplex factor which indicates the number of files that can be written in parallel to the tape drives attached to the storage server. Furthermore, step 69 determines the number of sessions required for a backup or restore operation which is the number data streams to be written to one tape drive. In step 70 the performance parameters determined in step 69 are represented to allow an optimized setup and configuration of the system complex by adjusting the corresponding parameters in the backup-restore controller, for example, the controller 51. Instead, the settings can be performed automatically by using the results of the step 69 directly as input data of the backup-restore controller.

The method steps described by reference to FIG. 4 may be implemented in a program product which is stored and distributed on a machine readable carrier or transmitted through a digital data network such as the Internet.

Figure 5:
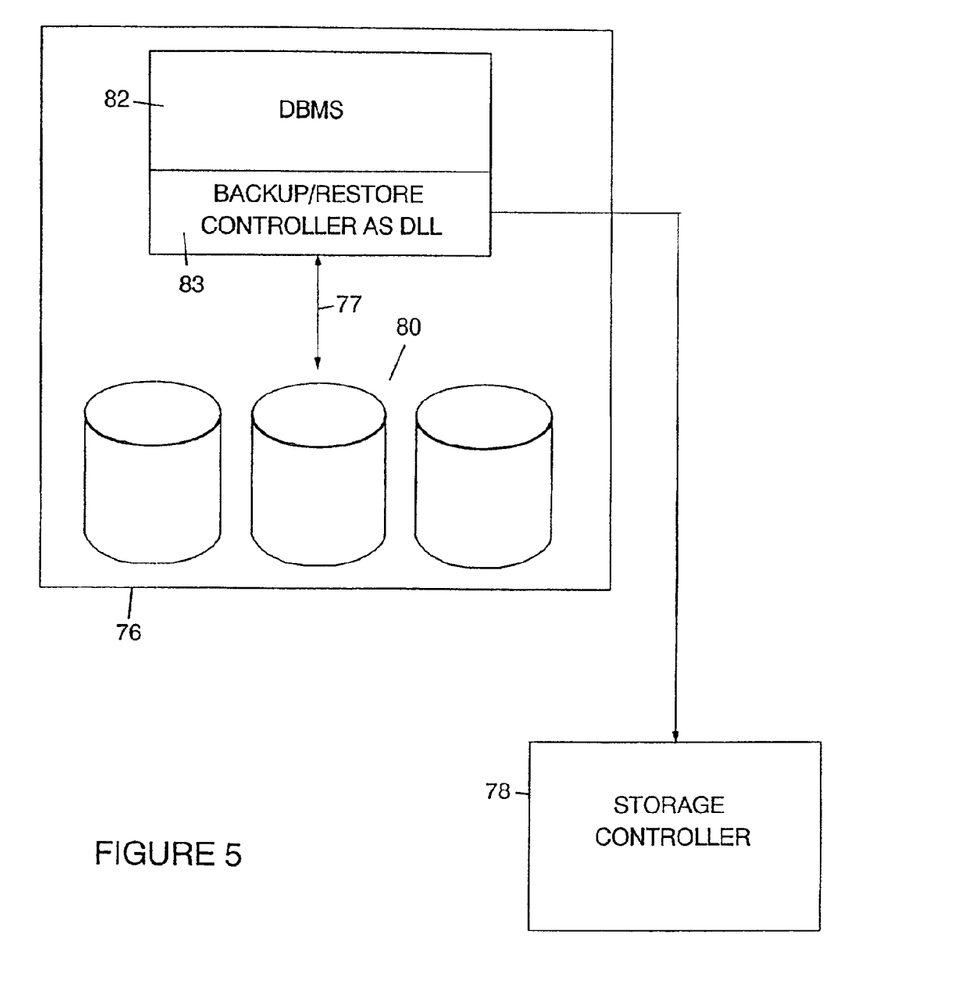
FIG. 5 is modified implementation of the invention.

FIG. 5 relates to a system configuration which deviates from that one shown in FIG. 3. This modified configuration is a database-oriented configuration in which the performance optimization does not extend to the input and output subsystem. Instead, the data subject of the backup operation come directly from a database of a client host 76 which apart from the I/O subsystem corresponds to the host 30 in FIG. 3. The host 76 is connected via data channel 77 to a storage server 78 which corresponds to the host 31 in FIG. 3. The host 76 comprises a database 80 which resides on a number of disk storage devices and which is administrated and operated by a database management system (DBMS) 82. A backup-restore controller 84 which corresponds to the controller 51 in FIG. 3 is installed as a shared library or as a Dynamic Link Library (DLL) in the database 82. Under the control of the backup-restore controller 84 the data subject of the backup operation are transferred from the database 80 via the DBMS 82 and data channel 77 to the storage server 78. In this configuration the information gathering on the client site is mainly directed to the components 21, 24, 25, 26 and 27 in FIG. 2 which provide information on the processors involved, the network subsystem, the buses used and the data source.

System Optimization for Data Backup and Restore Operations

The parameters which are to be optimized are related to the overall data throughput in GB/h (Gigabyte per hour). The following parameters are relevant for optimization of overall throughput in GB/h.

Definitions of Terms Used in the Description

Some definitions of terms used herein are described subsequently.

File: A file represents one backup object. At least one multiplexing file goes into one session.

Multiplexing. With multiplexing more than one file can be written in parallel into one session.

Session. A session represents a data stream to be written on one storage device i.e. a tape drive.

Compression. The implementation supports different kind of compression:

RL compression which will consume less CPU time but only compresses with an average compression ratio of 3:2; and     client API compression which consumes about half more CPU time than RL compression but has an better average compression ration of 5:2.

It is also possible to use both compressions but this will not sum the two ratios but an average compression ratio of 3:1 can be reached.

Variable definitions and definition parts of the system:

IO performance (io_max_read/io_max_write). The maximum read rate from disks for backup/write rate to disks for restore; for the following examples we assume that there is no difference between read and write rate, thus only (io_max) is used; if other applications are doing IO operations during backup/restore, an average IO performance (io_avg) is used.

bus[n] represents the maximum throughput of the bus n ioc[n] represents the maximum throughput of IO controller n disk[n]_read represents the average read rate of disk n
disk[n]_write represents the average write rate of disk n
Network throughput (tp). The maximum tp is (net_max); the average tp is (net_avg).
Machine internal data throughput over the buses. The maximum tp over the buses is (bus_max); the average tp over the buses is (net_avg).
Maximum read/write rate at the server side. The tape_max is the sum of all servers if more than one server is used. The tape_max[i] is the maximum rate on one server.
Available processing power of client system. The maximal CPU load is cpu_max; to simplify the calculations described herein the maximum CPU load is set to 100%.
Required processing power of the backup program. The required processing power of the backup operation is dp_cpu; in the implementation described it will be given in %.

Throughput Basics

The parameters which are to be optimized are related to the overall data throughput in GB/h (Gigabyte per hour). The following parameters are relevant for optimization of overall throughput in GB/h. To simplify the description of the gathering, processing and generation of parameters some assumptions are made:

1a) A bus controller can reach its maximum throughput if one device/adapter is attached to it and reaches a higher or equal throughput.
1b) A bus or controller has no controlling overhead if more than one device is attached to it.
1c) If n devices are attached to a controller or bus with a throughput (tp_max), the devices can reach an average performance of tp_max/n.
2) The network connectors used are dedicated for backup and restore operations. No other applications are using on the same network. This means that the network throughput is constant over time.

Rules Applied

The following rules should be maintained to ensure a maximum of data throughput:

a) The number of sessions should be limited by the number of tape drives available for backup.
b) The sum of the data throughput of all storage devices attached to a controller can not exceed the data throughput of that controller.
c) The sum of the data throughput of all adapters attached to a bus can not exceed the data throughput of that bus.
d) If IO and network devices share the same bus, the sum of data throughput of both storage and network devices must be less or equal to the maximum data throughput of the bus.

Performance of the IO Subsystem

The maximum throughput per IO controller (tp_io[n]):

tp_io[n]=min(ioc[n], sum(disk[i]))

where sum(disk[i]) is the sum disk[i] of all disks at controller n which contain relevant files for backup. If tp_io[n]>ioc[n], then tp_io[n]=ioc[n].

The maximum throughput per bus (tp_bus[n]):

tp_bus[n]=max(bus[n], sum(tp_io[i]))

where tp_io[i] is the throughput of the attached IO controllers and, if tp_bus[n]>bus[n], then tp_bus[n]=bus[n].

The overall IO throughput (io_max):

io_max=sum(tp_bus[i])

Determination of the Network Performance net_max=sum tp_bus[n]

tp_bus[n]=min(bus[n], sum(net[i]))

where net[i] are all attached network adapters which can be used to transfer data to the server.

Determination of Storage Server Performance server[n]=min (sum(net[i], sum(tape[i]))

where tape[i] is the performance of one tape and net[i] is the performance of one network adapter attached to the storage server that has connection to the client system.

server=sum(server[i])

which is the sum of throughput of all configured servers.

Determination of Overall Maximum Data Throughput on Client:

```
client_max
if (IO uses other buses than NET)
{
    client_max = io_max + net_max
}
else
{
    /** IO and Network adapter are on the same bus.
     * At least some network controllers share buses
     * with some IO controllers.
     **/
    /** But it makes a difference if we use compression
    or not */
    compress_ratio = 1
    if use_compression then compress_ratio = 1/2;
    bus[i] = min (
    client_max =
        sum(bus[i]/2)    /** buses with IO and
                             network controllers **/
        + sum(net[j])    /** network adapter which don't
                             share their bus with a IO controller */
        + sum(ioc[k])    /** IO adapter which don't share
                             their bus with a network adapter */
```

-continued

```
        /** This maximum through put can only be reached if
            the data read from one controller is not written to a controller on the same
            bus if the sum of the controllers throughput exceeds the throughput of the
            bus. */
}
if (client_max < (sum(ioc[i]) + sum(net[i]))
{
        /** the throughput of the controllers must be limited to avoid overhead when
        switching bus access */
        for (over all buses used by at least one IO controller and at least one network
        adapter){
        if (sum(ioc[k]) > bus[i] /(2 + 1/compr_ratio + 1))
        {
                if (sum(net[k]) > bus[i] / (2 + 1/compr_ratio +
                1)){
                        if sum(net[k]) = bus[i] /
        (2 + 1/compr_ratio + 1){
                                sum_ioc[k]) = bus[i] /
        (2 + 1/compr_ratio + 1)
                                sum(ioc[k]) = bus[i] - sum(net[k])
                                } else {
                        sum(ioc[k]) = bus[i] - sum(net[k])
                }
                }
                else {
                }
        }
}
```

Determination Whether Compression on Client has to be used if (net_max<io_max) and (net_max+io_max≦client_max) then use compression if (net_max<io_max) or (net_max+io_max>client_max) then use compression Backward Calculation if the Controllers have a Higher Data Throughput than the Buses Allow:

```
    if(bus[i] <
        (sum(server[k]) * 1/compress_ratio ) +
sum(server[k])))
        {
            /** 132 MB/s < 120 + 60 MB/s */
            sum(server[k]) = bus[i] / (2 + 1/compr_ratio -1)
            server[x]     = sum(server[k]) / number_of_servers
            sum(ioc[k])   = sum(server[k]) / compress_ratio
            ioc[x] = sum(ioc[k]) * tp_io[x]/sum(tp_io[k])
            /** note that sum(ioc[k]) is a little smaller than sum(server[k]); this will give room
                        for some additional bus traffic for memory access etc */
        }
```

Determination of Multiplexin Factor (mux)

mux=sum(ioc[i])/(sum(disk[k])/number_of_disks)/sessions

/**here we will round up because we don't reach the average read rate per disk for all disks at the same time*/

Determination of the number of sessions to be used sessions=min(round_up(server[i]/tp_tape), number_of_tapes)

Numeric Example

To simplify the description of the example the assumption is made that an off-line backup is performed in which the system performance and memory consumption can be disregarded. Furthermore, it is assumed that the files to backup are equally distributed over the disks.

System Setup:

System Bus:
 1×PCI Bus 132 MB/s

Network:
 1×Gigabit Ethernet (total 1000 MBit/s)
 net without compression 80 MB/s
 net with compression 160 MB/s Disk subsystem:
 2×ultrawide SCSI Controller with 80 MB/s
 Disks on controller 1:
 4×13 MB/s
 2×12 MB/s
 Disks on controller 2:
 3×11 MB/s
 4×13 MB/s Storage Server:
 3×Tape drive 20 MB/s Calculation:

$$tp\_io[1] = \min(ioc[1], \text{sum}(disk[i]))$$
$$= \min(80 \text{ MB/s}, 2*12 + 4*13 \text{ MB/s})$$
$$= 76 \text{ MB/s}$$
$$tp\_io[n] = \min(ioc[n], \text{sum}(disk[i]))$$
$$tp\_io[2] = \max(ioc[2], \text{sum}(disk[i]))$$
$$= \max(80 \text{ MB/s}, 3*11 + 4*13 \text{ MB/s})$$
$$= \max(80 \text{ MB/s}, 85 \text{ MB/s})$$
$$\text{if } tp\_io[2] > ioc[2]$$
$$\text{then } tp\_io[2] = ioc[2] \; tp\_io[2] = 80 \text{ MB/s}$$
$$io\_max = 76 + 80 \text{ MB/s}$$
$$= 156 \text{ MB/s}$$
$$net\_max = \min(bus[1], net[1])$$
$$= \min(132 \text{ MB/s}, 80 \text{ MB/s})$$
$$= 80 \text{ MB/s}$$

raw data rate (compressed or not):
$$server[1] = \min(net[1], \text{sum}(tape[i]))$$
$$= \min(80 \text{ MB/s}, 3*20 \text{ MB/s})$$
$$= 60 \text{ MB/s}$$

Because without compression only as much data as written from IO can be sent over the network and received by the storage server. The application would read 60 MB/s from a disk. Thus, without compression a maximum of 60 MB/s can be written to the tapes; this is equal to 180 GB/h.

With compression:

```
client_max = sum(bus[i]/2) + sum(net[j]) + sum(ioc[k])
           = 132 MB/s
if (net_max < io_max) or (net_max + io_max > client_max)
           then use compression
80MB/s < 156 MB/s
           so the application should use compression
compr_ratio = 1/2
The system meets the following requirement:
bus[i] < (sum( server[k]) * 1/compress_ratio) +
sum(server[k]))) so that the following backward
calculation has to be performed:
{
/** 132 MB/s <120 + 60 MB/s */
sum(server[k]) = bus[i] / (2 + 1/compr_ratio −1)
           = 132 MB/s/3
           = 44 MB/s
server[x]  = sum(server[k]) / number_of_servers
server[1]  = 44 [MB/s] / 1
           = 44 MB/s
sum(ioc[k])  = sum(server[k]) / compress_ratio
sum{ioc[k]}  = 44 [MB/s] / 1/2
           = 88 MB/s
ioc[x]  = sum(ioc[k]) * tp_io[x]/sum(tp_io[k])
ioc[1]     = 88 MB/s * 76 MB/s / 156 MB/s
ioc[1]     = 42 MB/s
ioc[1]     = 88 MB/s * 80 MB/s / 156 MB/s
ioc[1]     = 45 MB/s
}
sessions   = min(round_up(server[i] / tp_tape),
             number_of_tapes)
sessions   = min(round_up(44 / 20), number_of_tapes)
           = min(3, 3)
sessions   = 3
mux        = sum(ioc[i]) / (sum(disk[k]) / number_of_disks)
             / sessions
mux        = 88[MB/s / 156[MB/s]/13
mux        = 88 /12 / 3
mux            = 7.33 / 3
mux            = 4
```

While the invention is described with reference to preferred embodiments, modifications or other implementations are within the scope of the invention as defined in the claims.

What is claimed is:

1. A method for performance optimizing the transfer of bulk data between computer systems each having storage devices able to store large amounts of data, comprising the steps of:

gathering throughput-relevant information from system components involved in the transfer;

establishing a knowledge base that holds algorithms and data on relations and combinations of throughput-relevant information;

passing the gathered information to the knowledge base; and determining using the knowledge base a set of performance parameters that are effective to achieve a maximum data throughput.

2. The method of claim 1 in which the transfer is part of a backup or restore operation for bulk data.

3. The method of claim 1 in which one of the computer systems comprises a client system and another of the computer systems comprises a server system.

4. The method of claim 3 in which the information gathering step comprises the step of gathering information on a network used to connect the client system to the server system.

5. The method of claim 3 in which the information gathering step comprises the step of gathering information on the server system.

6. The method of claim 3, further comprising the step of evaluating the performance of the client system and its subsystems on the basis of the information gathered.

7. The method of claim 3, further comprising the step of evaluating the performance of a network used to connect the client system to the server system on the basis of the information gathered.

8. The method of claim 3, further comprising the step of evaluating the performance of the server system on the basis of the information gathered.

9. The method of claim 1 in which the set of performance parameters determined includes usage of data compression.

10. The method of claim 1 in which the set of performance parameters determined includes a multiplex factor to be applied.

11. The method of claim 1 in which the set of performance parameters determined includes a number of sessions to be used.

12. The method of claim 1 using a data transfer controller that is adjustable to adapt the throughput of data depending on configuration and status of the computer systems and further comprising the step of setting up the data transfer controller according to the determined set of performance parameters.

13. Apparatus for performance optimizing transfer of bulk data between computer systems each having storage devices able to store large amounts of data, comprising:

means for gathering throughput-relevant information from system components involved in the transfer;

means for establishing a knowledge base that holds algorithms and data on relations and combinations of throughput-relevant information;

means for passing the gathered information to the knowledge base; and means for determining using the knowledge base a set of performance parameters that are effective to achieve a maximum data throughput.

14. The apparatus of claim 13 in which one of the computer systems comprises a client system and another of the computer systems comprises a server system.

15. The apparatus of claim 13 including a data transfer controller that is settable to adapt the throughput of data depending on configuration and status of the computer systems and further comprising means for setting up the data transfer controller according to the determined set of performance parameters.

16. A program product stored on a machine readable data carrier for performance optimizing the transfer of bulk data between computer systems each having storage devices able to store large amounts of data, comprising the steps of:

gathering throughput-relevant information from system components involved in the transfer;

establishing a knowledge base that holds algorithms and data on relations and combinations of throughput-relevant information;

passing the gathered information to the knowledge base; and determining using the knowledge base a set of performance parameters that are effective to achieve a maximum data throughput.

17. The program product of claim 16 in which one of the computer systems comprises a client system and another of the computer systems comprises a server system.

18. The program product of claim 16 using a data transfer controller that is settable to adapt the throughput of data depending on the configuration and status of the computer systems and further comprising the step of setting up the data transfer controller according to the determined set of performance parameters.

* * * * *